March 15, 1949.　　　　W. H. STOUT　　　　2,464,466
COUPLING FOR PIPE SECTIONS
Filed Dec. 21, 1946　　　　　　　　3 Sheets-Sheet 1
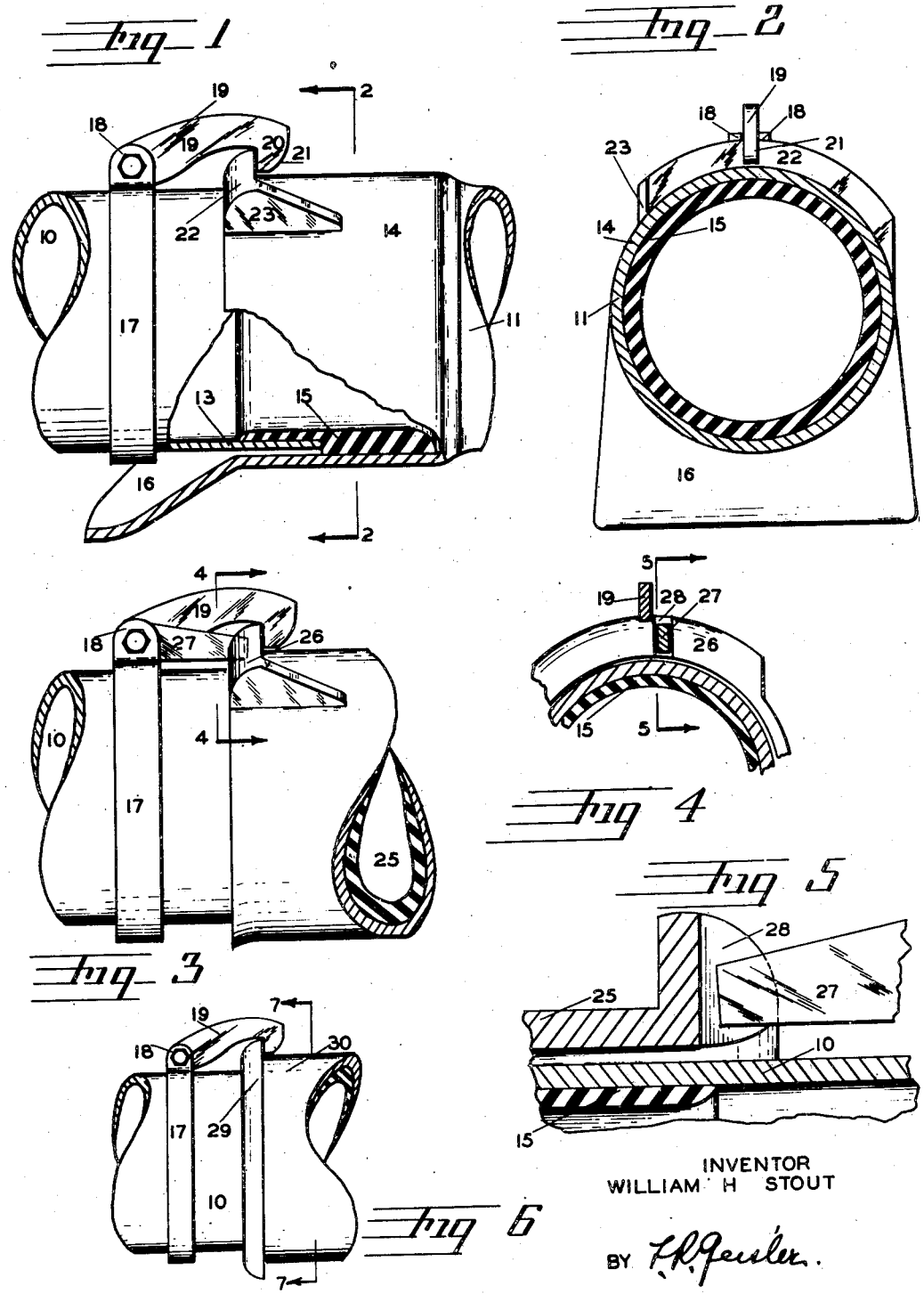
INVENTOR
WILLIAM H STOUT
BY F. R. Geisler
ATTORNEY March 15, 1949. W. H. STOUT 2,464,466
COUPLING FOR PIPE SECTIONS
Filed Dec. 21, 1946 3 Sheets-Sheet 2
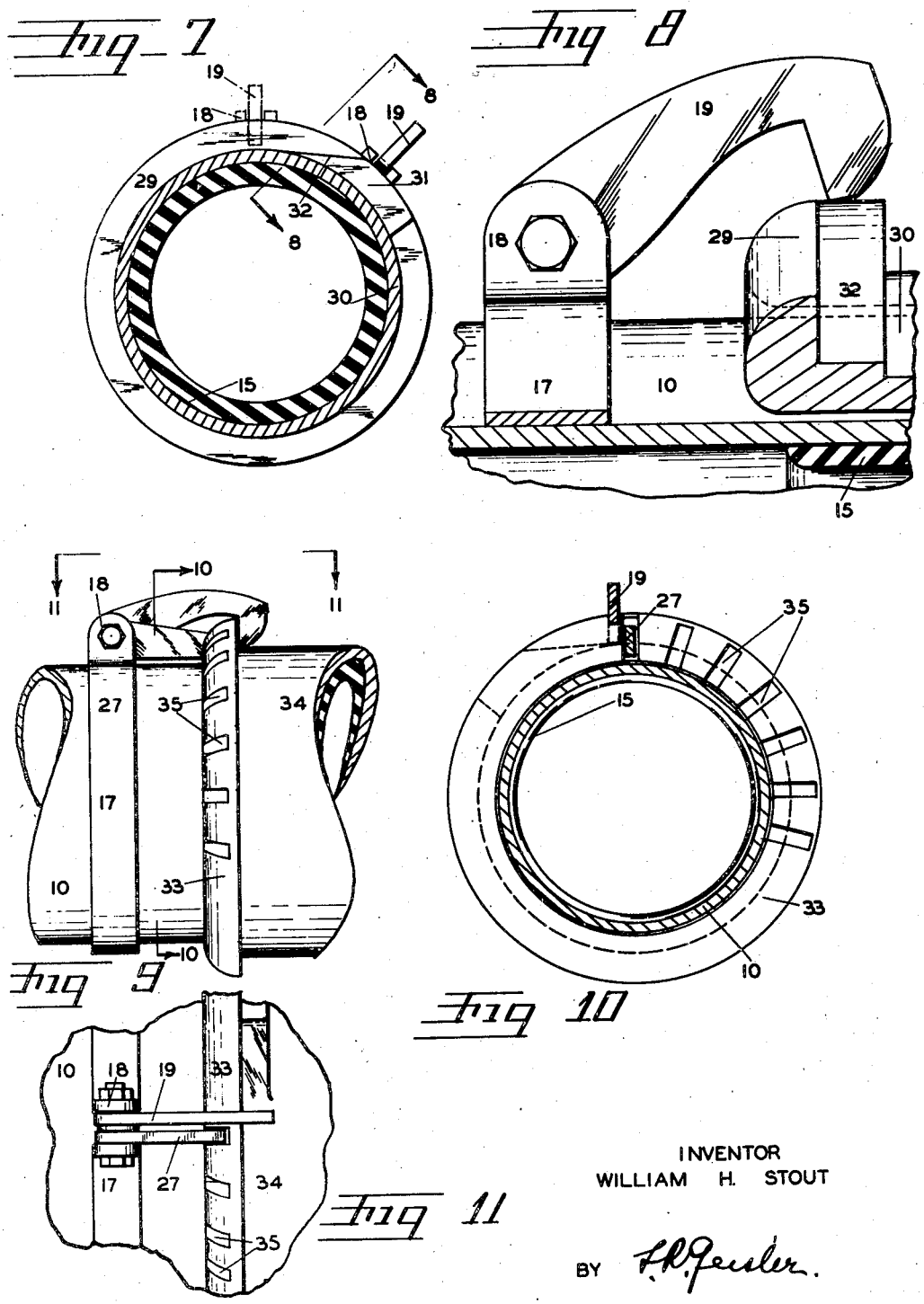
INVENTOR
WILLIAM H. STOUT
BY *F. R. Geisler*
ATTORNEY March 15, 1949.  W. H. STOUT  2,464,466
COUPLING FOR PIPE SECTIONS
Filed Dec. 21, 1946  3 Sheets-Sheet 3
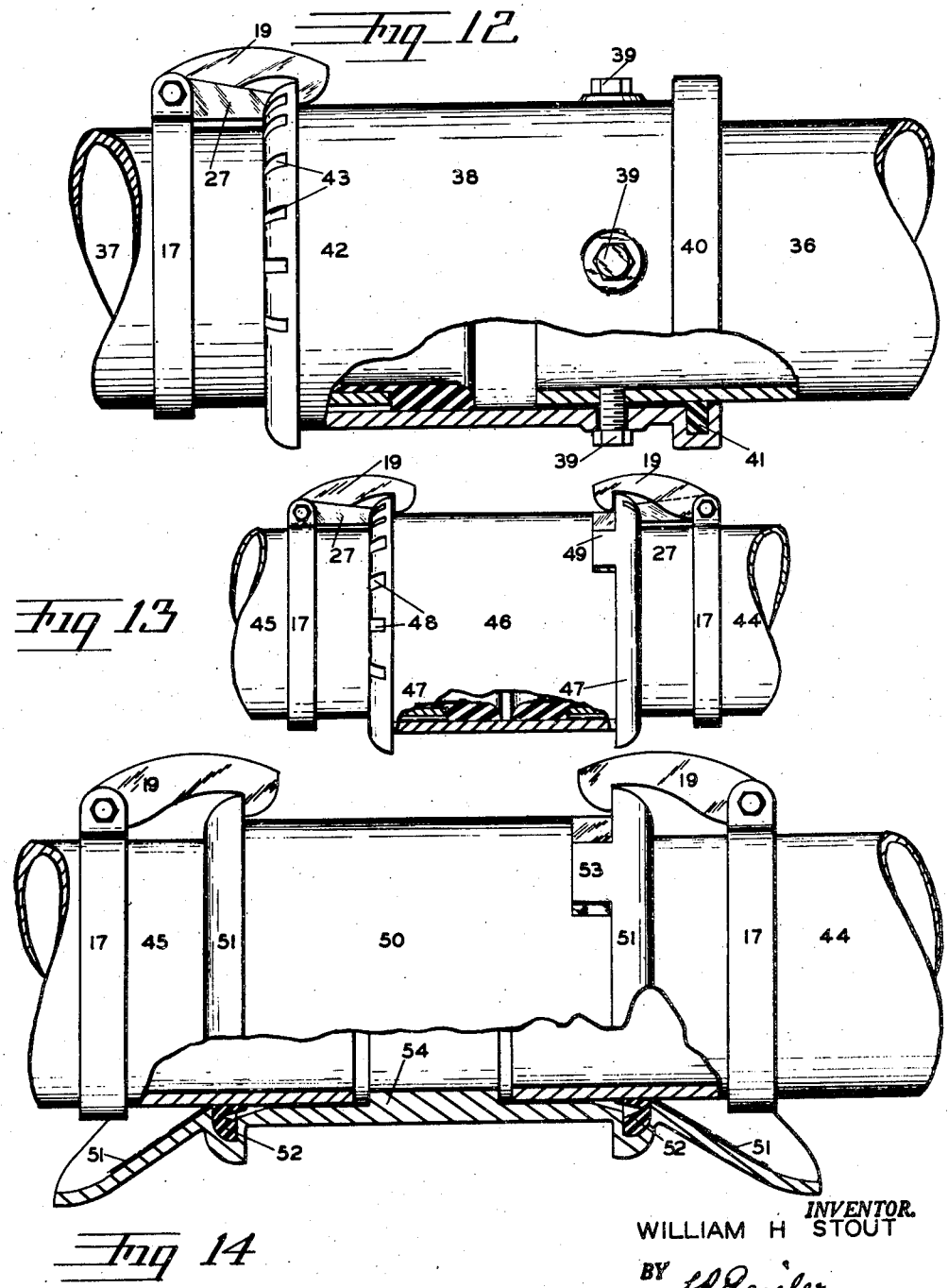
INVENTOR.
WILLIAM H STOUT
BY
ATTORNEY Patented Mar. 15, 1949

2,464,466

UNITED STATES PATENT OFFICE 2,464,466

COUPLING FOR PIPE SECTIONS

William H. Stout, Portland, Oreg.

Application December 21, 1946, Serial No. 717,788

5 Claims. (Cl. 285—170)

This invention relates to coupling means for conduits, such as water pipes, and, in particular, pipes used in demountable surface irrigation systems where it is necessary to provide means for coupling pipe sections together which will enable the pipes to be quickly and easily coupled or uncoupled.

More particularly this invention relates to pipe joints of the "bell" and "spigot" type in which one of the two coupled members has a larger diameter than the other so that the two members will be in telescoped relationship when coupled together and in which an expansible inner gasket provides a seal for the connected members.

An object of the present invention is to provide a simple, quick and practical means for locking the two members or two pipe sections together in coupled relationship to prevent any inadvertent separation of them when coupled.

A related object is to provide a coupling lock for the two pipe sections or members which are being coupled which will permit the locking to take place automatically when they are moved into telescoped positions, thus making possible a saving of time when a series of pipe sections are joined together in succession in the setting up of a temporary surface pipe line.

Another object of this invention is to provide a coupling of the type above indicated which can be unlocked merely by the turning of one of the members or pipe sections, so that each pipe section in a demountable irrigating pipe line can be uncoupled and pulled free from the next pipe section in a single operation.

An additional object is to provide optional supplemental means, for use in combination with such self-locking and unlocking means, which will prevent any inadvertent turning of the members or pipe sections when locked together and will hold them in a predetermined rotated position with respect to each other.

In the accompanying drawings, to which reference is to be made:

Fig. 1 is a side elevation of a coupling embodying one form in which my invention may be carried out;

Fig. 2 is a section on line 2—2 of Fig. 1;

Fig. 3 is a side elevation of a coupling similar to that of Fig. 1, but showing supplemental means added for the purpose of preventing any inadvertent turning of one pipe section with respect to the other;

Fig. 4 is a fragmentary transverse section on line 4—4 of Fig. 3;

Fig. 5 is an enlarged fragmentary longitudinal section corresponding to line 5—5 of Fig. 4;

Fig. 6 is a side elevation of another coupling embodying my invention;

Fig. 7 is a section on line 7—7 of Fig. 6;

Fig. 8 is an enlarged fragmentary longitudinal section corresponding to line 8—8 of Fig. 7;

Fig. 9 is a side elevation of the coupling similar to that of Fig. 6, but showing supplemental means added to hold the pipe sections in a predetermined rotated position with respect to each other;

Fig. 10 is a section on line 10—10 of Fig. 9;

Fig. 11 is a fragmentary plan view corresponding to line 11—11 of Fig. 9;

Fig. 12 is a side elevation, partly in section, of a coupling embodying my invention in which one of the coupling members is substituted for the bell end of a pipe section;

Fig. 13 is a side elevation, partly in section, drawn to smaller scale, of coupling similar in part to that of Fig. 12, but showing the large diameter coupling member detachably connected to both pipe sections in the same manner; and Fig. 14 shows a slightly modified coupling member in which the sealing gasket is placed in a hollow latch-engaging ridge.

Referring first to Figs. 1 and 2, the two pipe sections, which are coupled, are indicated by the reference characters 10 and 11, the spigot end 13 of pipe section 10 being shown in position in the bell end 14 portion of pipe section 11. The usual expansible self-sealing rubber gasket 15 extends from the spigot end into the bell, forming the seal between the two pipe ends. The bell 14 of Figs. 1 and 2 is shown formed with a base rest extension 16 upon which the bell end rests on the ground, which base rest prevents inadvertent rotating of the bell member and, in addition, acts as a guide for the spigot end when the latter is to be inserted in the bell.

A metal band 17, tightly clamped upon, or otherwise firmly secured to pipe section 10, carries a pair of ears 18 between which a latch member 19 is pivotally supported. The free end of the latch 19 is formed with the usual engaging shoulder 20, and terminates in a cam surface 21.

The bell end is formed with a latch-engaging ridge 22 extending part way around its periphery. The surface of the ridge 22 facing the band 17 on the spigot is rounded or sloped to constitute a cam surface. The opposite face of the ridge 22 is straight and substantially perpendicular to the bell axis. As apparent from Fig. 1, these ridge faces are so arranged that when the spigot 13 is being inserted in the bell 14 the latch 19 will ride up over the ridge 22 and then drop into locking engagement with the ridge. At one end only the ridge 22 terminates in a longitudinally-extending restraining wall 23, the other end being unobstructed.

When the two pipe sections 10 and 11 are to be coupled together the spigot end 13, with the gasket 15 mounted thereon, is merely pushed into the bell end 14 until the latch 19 automatically drops into the locking position illustrated in Figs. 1 and 2. The coupling of the pipes is then complete. When it is desired to uncouple the pipes it is not necessary to lift the latch 19 manually before pulling pipe section 10 free from pipe section 11, but a partial turning or rotating of pipe section 10, clockwise as viewed from the right in Fig. 1 and as viewed in Fig. 2, will cause the latch 19 to be moved out of engagement with the ridge 22 thus enabling pipe section 10 to be separated from pipe section 11. In taking an irrigation pipe line apart, comprising a series of pipe sections coupled end to end with my coupling, the fact that all that is necessary is for each pipe section in turn to be given a slight partial rotation and a pull to disengage it from the next section facilitates the work and saves the operator's time.

In Fig. 3 the pipe section 25, having the bell end into which the spigot end of pipe section 10 is to be inserted, is not formed with the base rest extension for the bell end as shown at 16 in Figs. 1 and 2. Since there is no flattened base rest there would be a possibility of the pipe section 25 being inadvertently rotated or turned part way when resting on the ground in the coupled pipe line, particularly if the usual upwardly - extending sprinkler connections were mounted on the pipe section 25. Such inadvertent partial rotation of pipe section 25 would not only move the sprinklers out of proper functioning position but, since the latch-engaging ridge 26, like the ridge 22 of Figs. 1 and 2, extends only a short distance around the outer perimeter of the pipe 25, partial rotation of pipe 25 might cause the coupling to come into unlocked position in which any axial movement along the pipe line might result in the inadvertent opening of the pipe joint. To prevent this I provide a separate locking arm 27, which is pivotally mounted between the pair of ears 18 and alongside of the latch 19, and which is adapted to be engaged by a notch 28 in the ridge 26 when the two pipe sections are coupled and are resting in their proper positions on the ground. The engagement of the locking arm 27 with the notch 28 then prevents either of the pipe sections rotating with respect to the other. In anticipation of the uncoupling of the pipe sections the locking arm 27 is manually lifted and swung back on the opposite side of the band 17 and then the coupling is in readiness to be uncoupled in the manner previously described with reference to Figs. 1 and 2 whenever uncoupling of the pipes is desired.

In the slightly modified coupling shown in Figs. 6 to 8 inclusive the locking ridge 29 on the bell end of pipe section 30, instead of extending only a short distance around the perimeter of the bell end, extends entirely around the pipe and thus becomes a locking flange having a rounded or cam-slope face on one side and a latch-engaging shoulder on the other side. In order to provide for the unlocking of the latch member 19 when the other end of pipe section 10 is grasped by the operator desiring to disconnect the pipes I discontinue the latch-engaging shoulder at one point by placing a latch-lifting lug 31 adjacent the peripheral locking ridge 29, which lug has a cam slope 32 so arranged as to cause the latch member 19 to be raised to the top of the ridge 29 if the pipe section 10, to which the latch member 19 is attached, is rotated in clockwise direction (as viewed in Fig. 7) with respect to pipe section 30. In Fig. 7 the broken line position of the latch member 19 shows the same in locked position while the corresponding full line shows the latch member 19 after a slight turn of the pipe section on which latch 19 is mounted has caused the latch to move up the cam slope 32 of the lug 31. Fig. 8 also shows the latch 19 in raised position on the lug 31. As apparent, when the latch is in this position the pipe section 10 can be pulled away from the other pipe section 30. Thus similarly with this modified form of my coupling all that is required for the uncoupling of the two pipe sections is for the operator to grasp one section, give it a partial rotation, and then pull it free from the other.

With the bell end portion of a pipe section terminating in a peripheral locking ridge or flange, like the ridge 29 of Fig. 7, and thus without any flat bottom rest for the pipe section, there may be a possibility of one section turning inadvertently with respect to the other. While such inadvertent turning would probably not cause the latch member to be brought into unlocked position, since the locking ridge extends entirely around the bell, nevertheless it may be desirable to prevent any such inadvertent partial rotation of any pipe section in order to maintain the sprinkler pipes in proper upright position.

In Figs 9, 10 and 11 I show the peripheral locking ridge 33 of the bell end of pipe section 34 formed with a series of locking notches 35, each of which, like the notch 28 of Fig. 4, is adapted to engage a locking arm 27 pivotally mounted adjacent the latch member 19, as previously described. When the two pipe sections are to be coupled together their relative positions are adjusted until the locking arm 27 will enter any one of the notches 35 as desired. Then when the spigot end is pushed into latched position the locking arm 27, by engagement with the selected notch 35, will prevent rotation of one pipe section with respect to the other. If the couplings throughout the pipe line are all provided similarly with locking arms and notches the entire pipe line can be held against inadvertent rotation and thus the sprinklers kept in proper position. With the locking ridge or flange 33 extending around the entire periphery it is possible to have the locking notches 35 positioned as far around as desired, which will be found to be an added convenience in a long pipe line, particularly when the pipe line extends transversely with respect to the general slope of the ground.

The locking arm, when engaging a notch on the ridge, as illustrated, for example, in Figs. 9 and 11, not only prevents rotation of one pipe section with respect to the other, but also prevents any further independent longitudinal movement of either pipe section towards the other, whereas the locking latch 19 at the same time prevents any longitudinal movement of either section away from the other. Thus the locking latch and locking arm cooperate to prevent longitudinal movement in either direction of one section with respect to the other as well as any rotational movement of one section with respect to the other.

When a surface pipe line having each pipe section connected to the next section by my coupling employing both the locking arm and the locking latch, in the manner illustrated in Figs. 9 and 11, is to be taken up and moved to another location, and all pipe sections are to be separated in the demounting and moving, the operator, in preparing for the demounting and moving of the pipe sections, first goes along the pipe line and swings each locking arm 29 backward on its hinge into inoperative position. Then when the time comes for the actual moving of the pipe sections, after the water has been turned off, the operator takes each pipe section in turn and, after giving it a slight rotation, pulls it out of engagement with the next section, as previously described.

The use of the locking arm together with the latch at each coupled joint in the pipe line also makes it possible for the operator, by disconnecting every other coupling, instead of disconnecting every coupling, to handle two sections or lengths of pipe as if they were a single section. For example, assuming that the irrigation pipe is manufactured in sections 20 feet in length, by keeping the coupling locked between two sections and unlocking the couplings at the ends of these two sections the operator can handle the two joined sections as if they were a single 40 foot section. In light weight irrigation pipe lines this is a considerable convenience.

In the description thus far it has been assumed that the latch member 19 and the locking arm 27 are mounted on the spigot section and that the locking ridge accordingly is located on the bell section. The drawings show this arrangement and I consider this the preferred arrangement. However, it would of course be possible to reverse these locations within the scope of my invention and thus mount the latch member, and the locking arm if the locking arm is employed, on the bell and have the locking ridge on the other pipe section near the spigot end.

Instead of having one of the joined pipe sections itself formed with the customary enlarged diameter end or bell end as illustrated, my invention is also carried out very practically with pipe sections having the same diameter throughout their extent either by securing a separate coupling member, having a larger internal diameter, on the end of one of the pipe sections, in which case the coupling member would correspond to the bell end previously described and permit the end of the other pipe to be inserted in the larger diameter member, or by having the special coupling member formed with a locking ridge near each end and with the two pipe sections inserted in the respective ends of the coupling member, the two pipe ends then corresponding to the spigot portions of the double coupling and each carrying a locking latch and locking arm.

In Fig. 12 the two pipe sections 36 and 37 are assumed to be the same diameter throughout their length, thus neither pipe section being formed with an enlarged or bell end. As a substitute for the bell end I provide a separate coupling member or short length of pipe having an internal diameter slightly larger than the external diameter of the pipe sections 36 and 37. This coupling member is rigidly secured on the end of one of the pipe sections, thus the section 36 as shown in Fig. 12, and when so secured serves the same purpose of the bell end. Various ways of securing the coupling member on the end of pipe section 36 could be employed. For example, in Fig. 12 I show a plurality of screws 39 mounted in threaded bosses and extending through registering holes in pipe section 36. A hollow ridge 40, extending around the periphery of the coupling member 38, provides a retaining groove for a packing ring or sealing gasket 41. The opposite end of the coupling member 38 is formed with a latch-engaging ridge 42, corresponding exactly to the ridge 33 of Figs. 9, 10 and 11. Pipe section 37, like pipe section 10 of the preceding figures, carries the latch member 19 and the locking arm 27. The ridge 42 is formed with slots 43 for engaging the locking arm 27 as previously described. The inner latch-engaging shoulder of the ridge 42 is also discontinued at one point where a latch lifting lug (not shown) is located.

In the manner of carrying out my invention illustrated in Fig. 13 the two pipe sections 44 and 45 are also of the same diameter throughout their entire length. Instead of permanently attaching a coupling member on the end of one of the pipe sections to serve as a substitute for the bell end I provide a modified coupling member 46, both ends of which are identical, and thus each end has a latch-engaging ridge. A latch member 19 and a locking arm 27 are mounted on each end of each pipe section to enter into latching and locking engagement with the respective ridge 47 on the coupling member. Each ridge 47 has slots 48 for the locking arm 27 and each ridge has a latch lifting lug 49 previously described.

The coupling member 50 of Fig. 14 resembles coupling member 46 of Fig. 3 in that it has a latch-engaging ridge at each end. However, coupling member 50 is slightly modified in form. Thus each end of the coupling member is formed with a base rest extension 51, similar to the base rest extension 16 of the bell shown in Figs. 1 and 2. The latch-engaging ridge 51 at each end of the coupling member is hollow and a V-shaped self-sealing expansible ring gasket 52 of the type also well known to the industry, is mounted in each hollow ridge. Since the base rests 51 serve also to prevent any inadvertent rotation of the coupling member 50 when the same is resting upon the ground I do not consider it necessary to use locking arms with this form of my coupling. A latch-lifting lug 53 is provided for each ridge as usual in order that each pipe section may be disconnected from the coupling member upon being given a slight rotation. The coupling member 50 also preferably has an internal central annular shoulder 54 which limits the extent to which each pipe section can be pushed into the coupling member.

Obviously various other modifications could be made in the individual coupling members or in the substitutes for bell ends of the pipe sections without departing from the principal of my invention and it is not my intention to limit my invention in any particulars otherwise than as set forth in the claims.

I claim:

1. In a pipe coupling including a pair of tubular members having their adjacent ends telescoped, the combination of latching means acting, when in operative position, to prevent longitudinal separation of said members but movable into inoperative position upon the rotation of one member with respect to the other, and cooperating but independent locking means capable of preventing rotation of the members with respect to each other when said latching means is in operative position.

2. In a pipe coupling of the character described, a pair of pipe sections, one of said pipe sections having a bell end, the other pipe section adapted to be inserted part way in said bell and constituting a spigot member, a gasket forming a seal between said pipe sections, a locking latch pivotally mounted on one of said sections, a latch-engaging ridge mounted on the other of said sections, said latch and said ridge having co-acting latch-operating faces at least one of which is a cam surface, said latch and said ridge having locking shoulders, the locking shoulder on said ridge being discontinued at one portion to permit said latch when moved sideways to said point to be pulled away from said ridge, whereby, when said spigot member is moved into said bell, said latch will ride over said ridge and drop into locking position, and when one of said pipe sections is rotated with respect to the other said latch will be moved out of engagement with said ridge shoulder, a locking arm pivotally mounted on said first mentioned section, and a locking notch on said ridge, whereby when said locking arm is in engagement with said notch the rotation of either of said sections with respect to the other, and thus the moving of said latch out of engagement with said ridge shoulder, will be avoided.

3. A locking coupling of the character described including a pair of members having telescoping adjacent end portions, an expansible gasket forming a seal between said members, a locking latch pivotally mounted on one of said members, a latch-engaging ridge on the other of said members, one face of said ridge constituting a cam surface for operating said latch, said latch and said ridge having locking shoulders, said ridge extending around the periphery of said other member, the locking shoulder on said ridge being discontinued on one portion of said ridge to permit said latch when moved sideways to said point on said ridge to be pulled away from said ridge, a latch-lifting lug located at said point, whereby, when one of said members is inserted in the other, said latch will ride over said ridge and drop into locking position, and when one of said members is rotated with respect to the other said latch will be moved out of engagement with said ridge shoulder, and a locking arm pivotally mounted on said first mentioned member adjacent said latch, said ridge having a plurality of locking notches, whereby when said locking arm is in engagement with any one of said notches the rotation of either of said members with respect to the other, and thus the moving of said latch out of engagement with said ridge shoulder, will be prevented.

4. In a coupling, a pair of tubular members having telescoping adjacent end portions, a locking latch mounted on the outside of one of said members, a latch-engaging ridge on the other of said members, said latch and said ridge having co-acting operating faces, at least one of which is a cam surface, and having co-acting engaging shoulders, whereby when said members are moved into telescoping position said latch will ride over said ridge and said shoulders will then engage each other and hold said members against longitudinal separation, the shoulder on said ridge being relieved at one point on said ridge to permit said latch to be disengaged from said ridge by the rotation of one of said members with respect to the other, and separate locking means capable, when placed in locked position, of preventing said rotation of one member with respect to the other.

5. The combination set forth in claim 4 with said locking means consisting of a pivoted locking arm on said first mentioned member and an arm-engaging slot on said ridge of said other member.

WILLIAM H. STOUT.

REFERENCES CITED

The following references are of record in the file of this patent:

UNITED STATES PATENTS

| Number | Name | Date |
|---|---|---|
| 162,169 | Hopkins | Apr. 20, 1875 |
| 999,169 | Jones | July 25, 1911 |
| 1,415,157 | Courchene | May 9, 1922 |